United States Patent
Kirschner (10) Patent No.: US 7,798,376 B2
(45) Date of Patent: Sep. 21, 2010

(54) COFFEE AND TEA DOSING SYSTEM

(75) Inventor: Jonathan Kirschner, Powder Springs, GA (US)

(73) Assignee: The Coca-Cola Company, Atlanta, GA (US)

( * ) Notice: Subject to any disclaimer, the term of this patent is extended or adjusted under 35 U.S.C. 154(b) by 921 days.

(21) Appl. No.: 11/530,966

(22) Filed: Sep. 12, 2006

(65) Prior Publication Data

US 2007/0210120 A1    Sep. 13, 2007

Related U.S. Application Data

(63) Continuation-in-part of application No. 11/162,178, filed on Aug. 31, 2005.

(51) Int. Cl.
 *G01F 11/10* (2006.01)
(52) U.S. Cl. .................................. 222/361; 222/181.1
(58) Field of Classification Search ......... 222/361–364, 222/287, 342–360, 180, 181.1–181.3, 185.1, 222/226, 397–399; 99/323.3, 289, 287
See application file for complete search history.

(56) References Cited

U.S. PATENT DOCUMENTS

| | | | |
|---|---|---|---|
| 317,678 A | | 5/1885 | Schombel |
| 470,018 A | * | 3/1892 | Strong .......................... 222/130 |
| 531,599 A | * | 12/1894 | Ross et al. .................... 222/245 |
| 1,455,970 A | * | 5/1923 | Resek .................... 222/153.03 |
| 1,485,032 A | | 2/1924 | Janes |
| 1,692,356 A | * | 11/1928 | Straub ......................... 222/305 |
| 1,770,576 A | | 7/1930 | Leather |
| 3,347,425 A | | 10/1967 | Beaushausen et al. |
| 3,446,403 A | | 5/1969 | Serio |
| 3,599,842 A | * | 8/1971 | Boster ......................... 222/195 |
| 3,955,718 A | | 5/1976 | Von Holdt et al. |
| 4,011,969 A | * | 3/1977 | Martin ......................... 222/196 |
| 4,071,171 A | * | 1/1978 | Bassignani ................... 222/305 |
| 4,101,284 A | * | 7/1978 | Difiglio et al. .............. 422/100 |
| 4,403,715 A | | 9/1983 | Ludovissie |
| 4,516,701 A | * | 5/1985 | Tribble ......................... 222/361 |
| 4,610,378 A | | 9/1986 | Grossi |
| 4,733,803 A | * | 3/1988 | Sisson et al. ................. 222/276 |
| 4,836,424 A | | 6/1989 | Afshar |
| 5,086,818 A | | 2/1992 | Bendt |
| RE34,382 E | | 9/1993 | Newnan |
| 5,287,993 A | | 2/1994 | Ford et al. |
| 5,341,961 A | * | 8/1994 | Hausam ....................... 222/217 |
| 5,381,967 A | | 1/1995 | King |
| 5,421,491 A | * | 6/1995 | Tuvim et al. ................ 222/336 |
| 5,495,962 A | * | 3/1996 | Nomura ......................... 222/80 |
| D378,650 S | | 4/1997 | Wong |
| 5,651,401 A | * | 7/1997 | Cados .......................... 141/129 |

(Continued)

FOREIGN PATENT DOCUMENTS

EP    1591055 A1    11/2005

(Continued)

*Primary Examiner*—Lien T Ngo
(74) *Attorney, Agent, or Firm*—Sutherland Asbill & Brennan LLP (57) ABSTRACT

A doser for dispensing a predetermined dose of material. The doser may include an agitation device, with the material stored in the agitation device, and a dosing block cooperating with the agitation device.

9 Claims, 10 Drawing Sheets

U.S. PATENT DOCUMENTS

| | | |
|---|---|---|
| 5,908,144 A | 6/1999 | Dalton |
| 5,927,558 A | 7/1999 | Bruce |
| 5,967,383 A | 10/1999 | Hidalgo |
| 6,382,470 B1 | 5/2002 | Hu et al. |
| 6,450,371 B1 | 9/2002 | Sherman et al. |
| 6,732,772 B2 | 5/2004 | Woodruff |
| 6,749,091 B2 | 6/2004 | Connelly et al. |

FOREIGN PATENT DOCUMENTS

| | | |
|---|---|---|
| FR | 2791545 A1 | 3/1999 |
| WO | 02075260 A1 | 9/2002 |

* cited by examiner

COFFEE AND TEA DOSING SYSTEM

RELATED APPLICATIONS

The present application is a continuation in part of U.S. patent application Ser. No. 11/162,178, filed on Aug. 31, 2006.

TECHNICAL FIELD

The present application relates generally to an automatic coffee and tea brewing device and more particularly relates to a coffee and tea brewing device with a dosing system.

BACKGROUND OF THE INVENTION

Fully automatic coffee and tea brewing devices are known. These brewing devices generally store, for example, whole coffee beans in a hopper. The user generally selects the type of coffee desired, i.e., espresso, cappuccino, latte, etc., and the device grinds the beans from the hopper. The device then drops the ground beans into a brewing chamber, compresses the grounds to create a brewable coffee block, and brews the block by forcing high pressure hot water therethrough.

These known automatic coffee brewing devices, however, may have several drawbacks. For example, if the beans are left in the hopper for more than a few days, the beans tend to lose their freshness and may go stale. Further, the grinders used in these machines may not be suitable for grinding coffee as finely as desired for certain types of beverages such as espresso. Adequate espresso grinds generally require constant adjustment so as to provide a "Barista" quality beverage. Such adjustments, however, may not be practical and, in fact, may defeat the purpose of an automatic brewer. Finally, known automatic devices may tend to clog and/or provide more or less of a dose of coffee as may be desired. The ultimate result may be a beverage with an unsatisfactory taste.

Likewise with respect to tea, tea extracts and concentrates can quickly provide large volumes of tea and also may have an extended shelf life. The quality of the tea produced by such extracts and concentrates, however, often is not as high as that made from traditional tea bags. Moreover, conventional brewing of regular tea leaves is problematic given that the tea leaves may not flow or brew as desired.

There is a desire, therefore, for an automatic coffee and tea brewing device that provides fresh, properly dosed coffee, tea, and other types of brewed beverages in a fast and efficient manner. The device preferably should be adaptable to various types of beverages.

SUMMARY OF THE INVENTION

The present application thus describes a doser for dispensing a predetermined dose of material. The doser may include an agitation device, with the material stored in the agitation device, and a dosing block cooperating with the agitation device.

The dosing block may include a first aperture positioned on a first side of the dosing block, a second aperture positioned on a second side of the dosing block, and a sliding plate positioned between the first side and the second side. The sliding plate may include a dosing aperture movable between the first aperture and the second aperture.

The agitation device may include a box shoe for positioning one or more boxes therein. The agitation device may include one or more cam blocks attached to the dosing block for movement therewith. One or more wheel pins may be mounted on the cam blocks. One or more cams may be mounted about the box shoe for cooperating with the one or more wheel pins. The agitation device pivots about the dosing block.

The dosing block may include a first number of apertures positioned on a first side of the dosing block, a second number of apertures positioned on a second side of the dosing block, and a sliding plate positioned between the first side and the second side. The sliding plate may include a number of dosing apertures movable between the first number of apertures and the second number of apertures. The dosing block may include a number of sliding plates aligned with the second number of apertures. A number of solenoids may be in communication with sliding plates.

The doser further may include a connection system positioned between the agitation device and the doser block. The connection system may include a lance positioned thereon. The material may be positioned within a material box.

The present application further describes a doser for dispensing a predetermined dose of materials. The doser may include an agitation device, with the agitation device having a shoe with the materials are stored therein, a first positioning element positioned about the shoe, and a dosing block cooperating with the agitation device. The agitation device may include a second positioning element in communication with the dosing block so as to cooperate with the first positioning element positioned about the shoe.

The first positioning element may include a cam. The second positioning element may include a wheel pin. The doser dosing block may include a first aperture positioned on a first side of the dosing block, a second aperture positioned on a second side of the dosing block, and a sliding plate positioned between the first side and the second side. The sliding plate may include a dosing aperture movable between the first aperture and the second aperture. The agitation device pivots about the dosing block.

The present application further describes a method of dosing a predetermined amount of tea leaves. The method may include the steps of storing the tea leaves in a tea container, flowing the predetermined amount of tea leaves into a dosing aperture, sliding the predetermined amount of tea leaves within the dosing aperture from a first position to a second position, pulling the tea container towards the dosing aperture as the dosing aperture slides, and releasing the tea container so as to agitate the tea leaves therein.

The present application describes a tea dispenser. The tea dispenser may include a tea doser, a brewer in communication with the doser, and a beverage selection device in communication with the doser such that the doser dispenses one or more doses of tea in response to a volume of tea selected at the beverage selection device. The tea doser may include an agitation device.

These and other features of the present application will become apparent to one of ordinary skill in the art upon review of the following detailed description when taken in conjunction with the several drawings and the appended claims.

DETAILED DESCRIPTION

Figure 1:
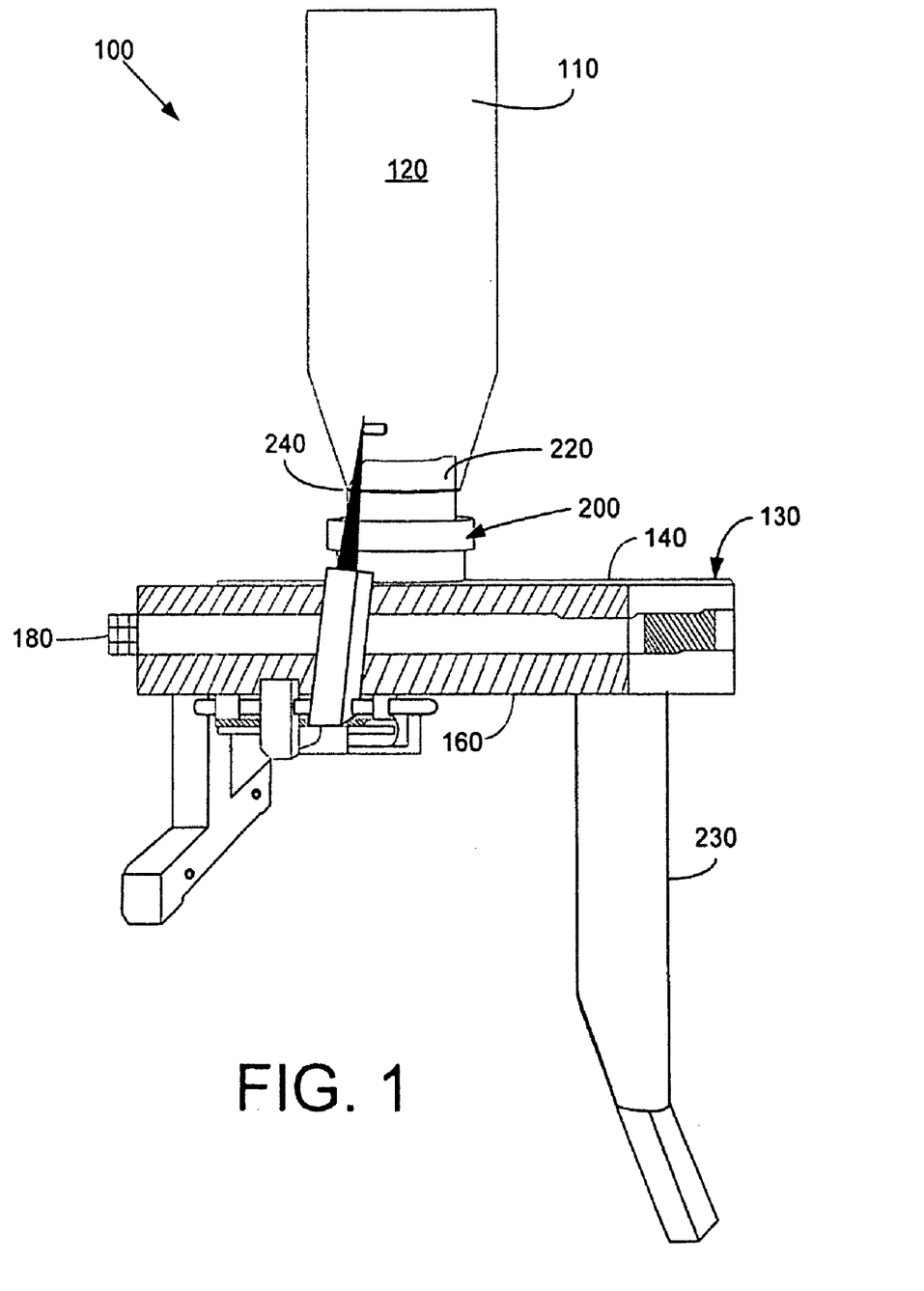
FIG. 1 is a perspective view of an example of a coffee dosing system as is described herein.
Figure 2:
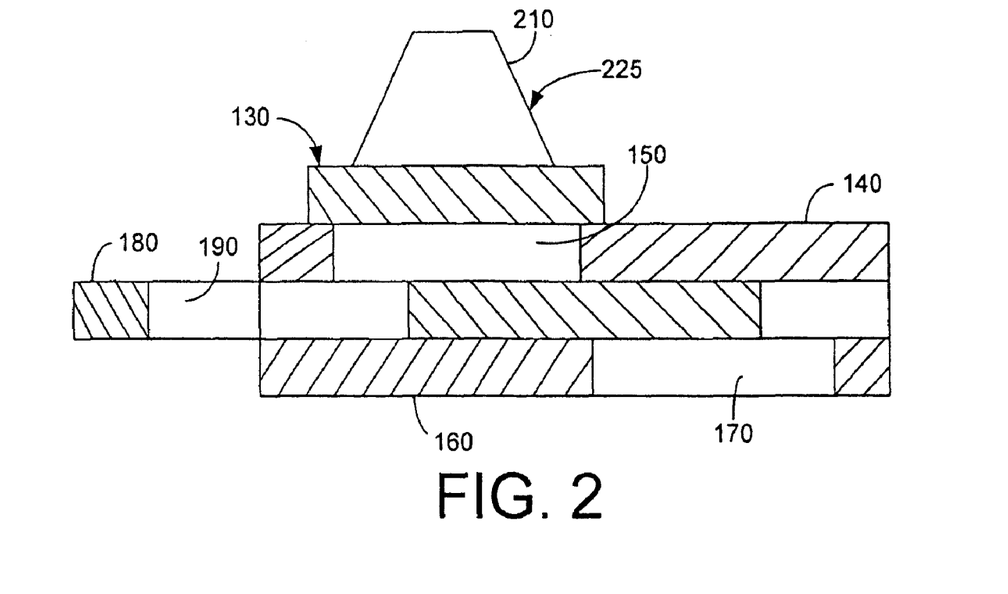
FIG. 2 is a side cross-sectional view of the dosing block of the coffee dosing system of FIG. 1.

Referring now to the drawings, in which like numerals indicate like elements throughout the several views, FIGS. 1 and 2 show a coffee dosing system 100 as is described herein. The coffee dosing system 100 includes a grind bag 110. The grind bag 110 may be made out of a gas impermeable material such as a multilayer composite with foil, an EVOH film (Ethylene Vinyl Alcohol Polymer) or the like, or similar types of materials. The grind bag 110 may be filled with an amount of ground coffee 120. Any other type of brewable or mixable material also may be used herein. In fact, any type of flowable materials or particles may be used herein. The grind bag 120 may be filled with nitrogen or similar gases to preserve the freshness of the ground coffee 120 or other materials therein.

The coffee dosing system 100 also may include a dosing block 130. The dosing block 130 may be made out of plastic, metal, or similar types of materials. The dosing block 130 may include a top block 140 with a first aperture 150 and a bottom block 160 with a second aperture 170. The dosing block 130 further may include a plate 180 slideably positioned therein. The plate 180 may be driven a motor driven cam, a slide assembly, a piston, a solenoid, or a similar type of mechanism. The plate 180 may have a dosing aperture 190 positioned therein. The dosing aperture 190 may slide between a first position adjacent to the first aperture 150 of the top block 140 and a second position adjacent to the second aperture 170 of the bottom block 160. The plate 180 may be lubricated by using different materials, a food grade lubricant, or similar means.

Figure 3:
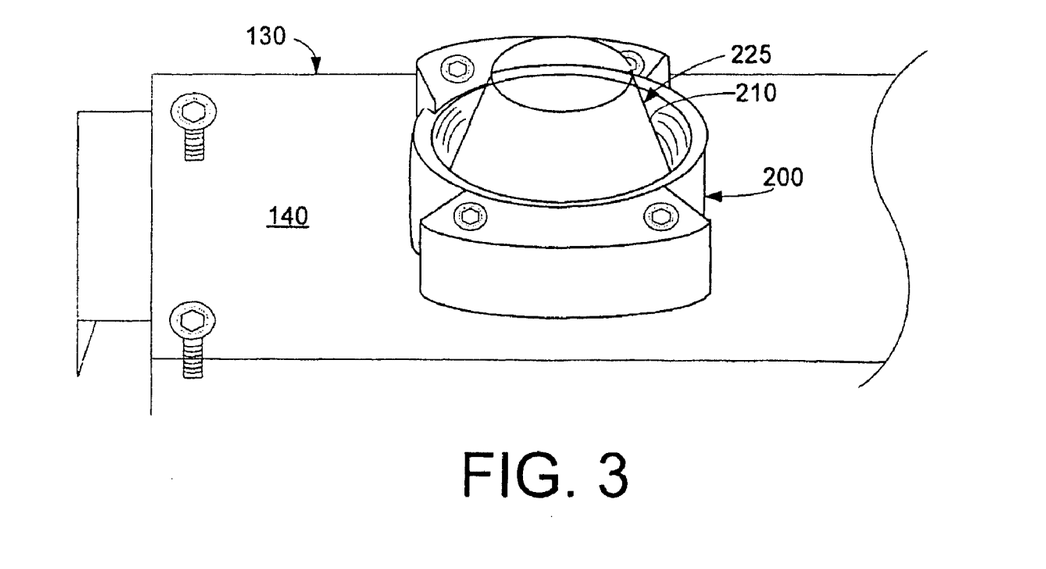
FIG. 3 is a perspective view of a reverse taper coupling of the coffee dosing system of FIG. 1.

The coffee dosing system 100 also may include a coupling mechanism 200. The coupling mechanism 200 may include a male member 210 positioned about the first aperture 150 on the top block 140 of the dosing block 130 and a female member 220 positioned about one end of the grind bag 110. (The respective positions of the members 210, 220 may be reversed as is desired.) The members 210, 220 preferably have a reverse taper 225. In other words, the diameter of the members 210, 220 increases as the members 210, 220 extend from the grind bag 110 towards the first aperture 150. The reverse tapering ensures there is no bridging of the ground coffee 120 such that all of the coffee travels into the dosing aperture 190. The reverse taper 225 also ensures that there is substantially consistent pressure on the ground coffee 120 or other material to ensure repeatable weights. Coffee density also should be substantially consistent. The coffee dosing system 100 also may include an exit conduit 230. The exit conduit 230 may lead to a brewing device (not shown) as is known or elsewhere.

The coffee dosing system 100 further may include one or more vibrating arms 240. The vibrating arms 240 may be positioned about the grind bag 110 adjacent to the coupling mechanism 200. The vibrating arms 240 may be driven by a conventional drive mechanism (not shown) such as such as a cam follower actuated by the slide mechanism, by a separate drive system providing linear motion or vibration motion, or by similar devices. The vibrating arms 240 ensure proper flow of the ground coffee 120 or other materials into the coupling mechanism 200 and the dosing aperture 190 of the dosing block 130.

In use, the ground coffee 120 should stay fresh within the grind bag 110 for up to about one (1) year given a nitrogen flush or similar techniques. The coffee 120 may be ground as desired. Specific coffee grinding techniques are described in commonly owned U.S. patent application Ser. No. 10/908, 350, entitled "Coffee and Tea Pod", incorporated herein by reference. The grind bag 110 is then attached to the dosing block 130 via the coupling mechanism 200. When a brewed beverage is desired, the plate 180 slides such that the dosing aperture 190 is positioned underneath the first aperture 150 of the top block 140 in line with the coupling mechanism 200. As the dosing aperture 190 aligns with the first aperture 150, a measure of the ground coffee 120 falls into the dosing aperture 190. The size, shape, depth and/or the diameter of the dosing aperture 190 may be arranged for the predetermined volume of the ground coffee 120 or other material as required for a particular beverage.

After a predetermined amount of time or other variable, the plate 180 begins to slide towards the second aperture 170 on the bottom block 160 of the dosing block 130. As the plate 180 moves away from the first aperture 150, the grind bag 110 is closed off to oxygen permeation. The only chance for oxygen to enter the grind bag 110 is the brief moment that the dosing aperture 190 is positioned about the first aperture 150. Even in this scenario, however, oxygen can only contact the ground coffee 120 that is about to he used.

The use of the reverse taper 225 in the coupling mechanism 200 again ensures that all of the ground coffee 120 travels to the dosing aperture 190 and that no bridging of the ground coffee 120 occurs. As the dosing aperture 190 aligns with the second aperture 170 on the bottom block 160, the ground coffee 120 falls out of the dosing block 130 and into the exit conduit 230. Depending upon the nature of the desired beverage, multiple doses of the ground coffee 120 or other materials may be dispensed into the exit conduit 230 at one time. The ground coffee 120 then travels toward the brewing device (not shown) or elsewhere. Once the ground coffee 120 is depleted from the grind bag 110, the grind bag 110 may be removed and refilled or replaced.

Figure 4:
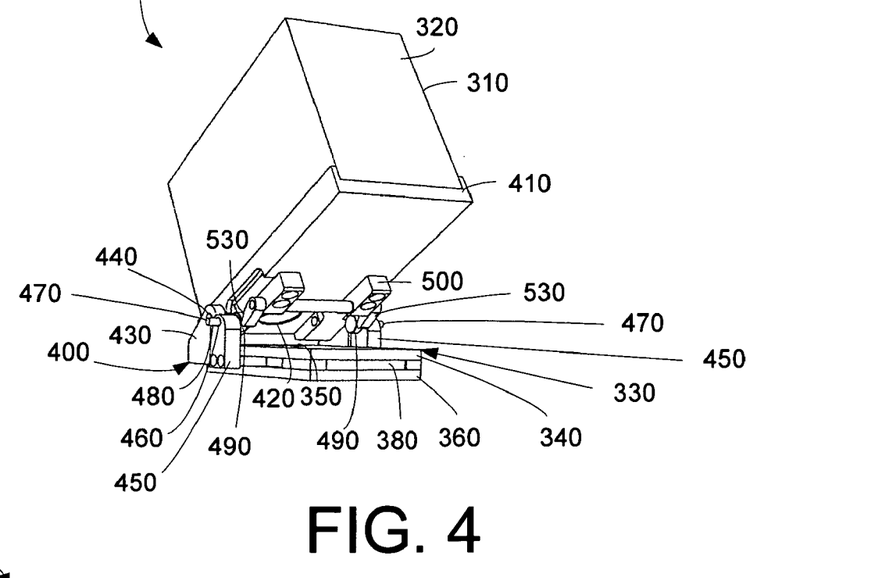
FIG. 4 is a perspective view of a tea dosing system as is described herein.

FIGS. 4-6 show a tea dosing system 300 as is described herein. The tea dosing system 300 includes a tea box 310 or a similar type of container. The tea box 310 may include an outer box made out of cardboard, plastic, or any other desired materials. The interior of the tea box 310 may include a bag or other type of container made out of a substantially gas impermeable material. The tea bag 310 may be filled with an amount of tea leaves 320 or any other type of brewable or mixable materials. In fact, any type of flowable materials or particles may be used herein. The tea box 310 may have an opening on the one end thereof. The opening may be a diaphragm-type opening or the like so as to limit the intake of air. The tea box 310 can take any desired size or shape.

The tea dosing system 300 also may include a dosing block 330. The dosing block 330 may be similar to the dosing block 130 described above. Specifically, the dosing block 330 may include a top block 340 with a first aperture 350 and a bottom block 360 with a second aperture 370. The dosing block 330 further may include a plate 380 slideably positioned therein. The plate 380 may have a dosing aperture 390 positioned therein. The dosing aperture 390 may slide between a first position adjacent the first aperture 350 of the top block 340 and a second position adjacent the second aperture 370 of the bottom block 360. As described above, the use of the first aperture 350 and the separated second aperture 370 ensures that the contents of the tea box 310 have little exposure to the outside air. The plate 380 may be lubricated by using different materials such as a food grade lubricant or otherwise.

The coffee dosing system 300 also may include a coupling mechanism such as the coupling mechanism 200 described above. Similar type of connection devices may be used herein.

The tea dosing system 300 also may include an agitation device 400 that cooperates with and is attached to the dosing block 330. The agitation device 400 includes a box shoe 410. The box shoe 410 is sized to accommodate one or more tea boxes 310. The box shoe 410 may have an aperture 420 positioned on one end. Part of the coupling mechanism 200 may be positioned within the aperture 420.

The box shoe 410 may be attached to the dosing plate 330 via a pair of side bars 430. The side bars 430 may be positioned on either side of the dosing block 330. The box shoe 410 may pivot about the side bars 430 via a pair of rods 440 or by similar types of connection means.

Positioned adjacent to the side bars 430 and attached to the plate 380 of the dosing block 330 may be a pair of cam blocks 450. The cam blocks 450 may be fixably attached to the plate 380 for movement therewith. The cam blocks 450 may have an aperture 460 positioned therein. A pair of wheel pins 470 may be positioned through the aperture 460. Each wheel pin 470 has a shaft 480 that extends through the aperture 460 and a wheel 490 attached to the shaft.

Attached to the box shoe 410 may be a pair of pivot blocks 500. The pivot blocks 500 may be fixably attached thereto. The pivot blocks 500 may each include an aperture 510 positioned therein. A camshaft 520 may extend through the apertures 510. A pair of cams 530 may be attached to either end of the camshaft 520. The cams 530 have an elongated oblong shape. Any desired shape may be used. The cams 530 cooperate with the wheel pins 470 as will be described in more detail below.

Operation of the tea dosing system 300 is shown in FIGS. 5 A-E and 6 A-E. In the starting position shown in FIGS. 5A and 6A, the box shoe 410 and the tea box 310 are in the elevated position. Likewise, the dosing aperture 390 of the plate 380 of the dosing block 330 is positioned about the aperture 420 of the box shoe 410 and the connection system 200 so as to allow tea leaves 320 to pass therethrough.

Figure 5A:
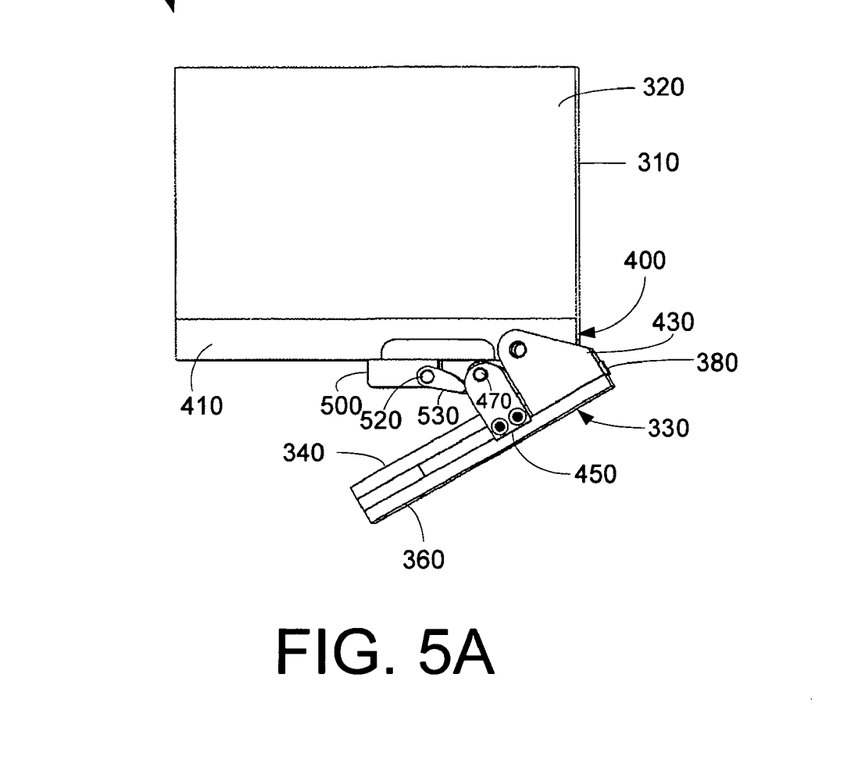
FIGS. 5A-5E are side plan views of the tea dosing system of FIG. 4 in operation.
Figure 5B:
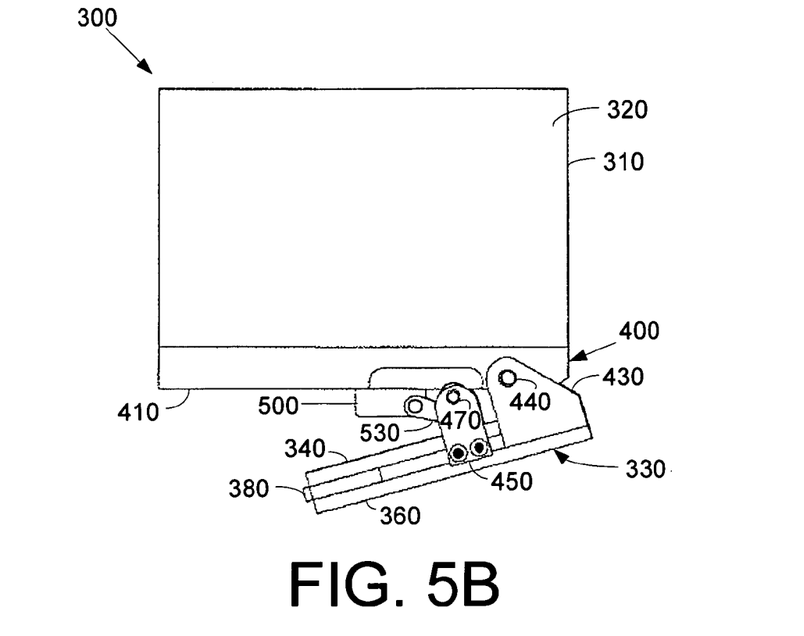
Figure 6A:
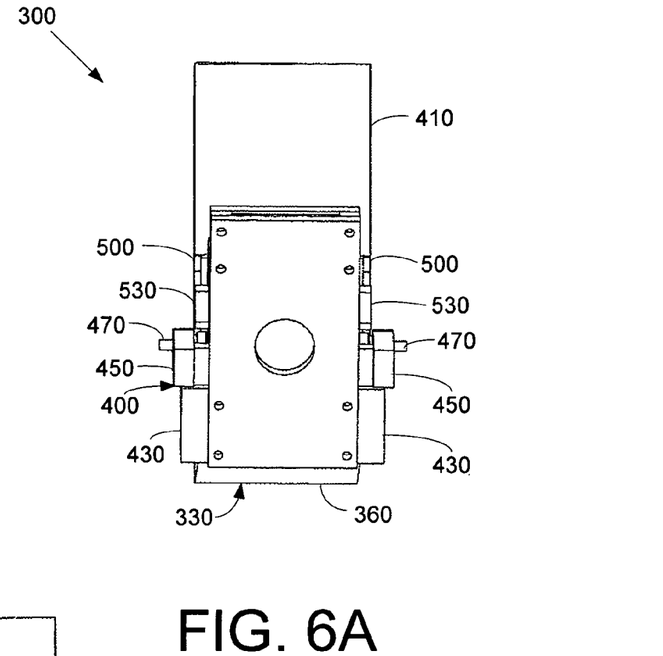
FIG. 6A-6E are bottom plan views of the tea dosing system of FIG. 4 in operation.
Figure 6B:
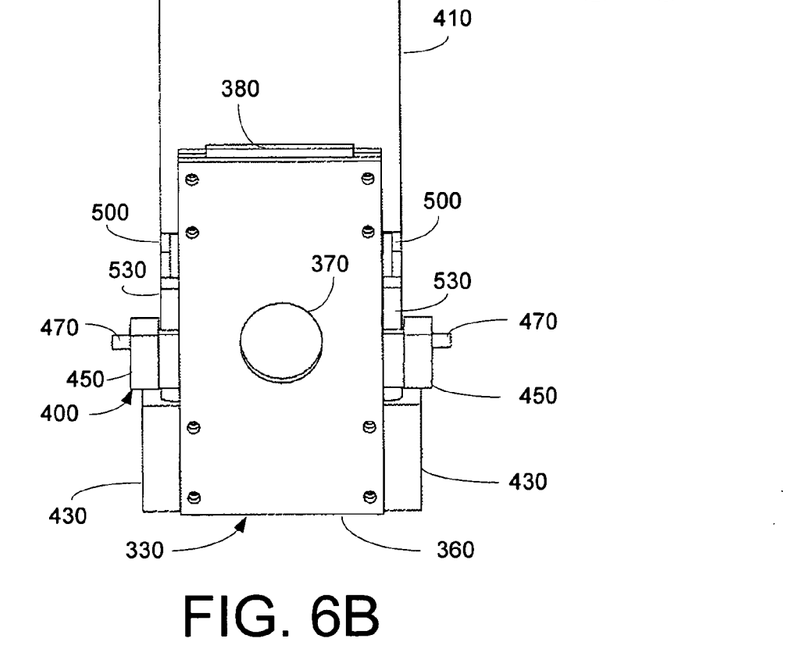

As the plate 380 of the dosing block 330 moves forward as shown in FIGS. 5B and 6B, the wheel pins 470 and the cam blocks 450 also move forward such that the wheels 490 of the wheel pins 470 begin to force the cams 530 downward so as to lower the box shoe 410 and the tea box 310. Likewise, the dosing aperture 390 moves away from the aperture 350 of the top block 340 so as to close off the tea box 310.

Figure 5C:
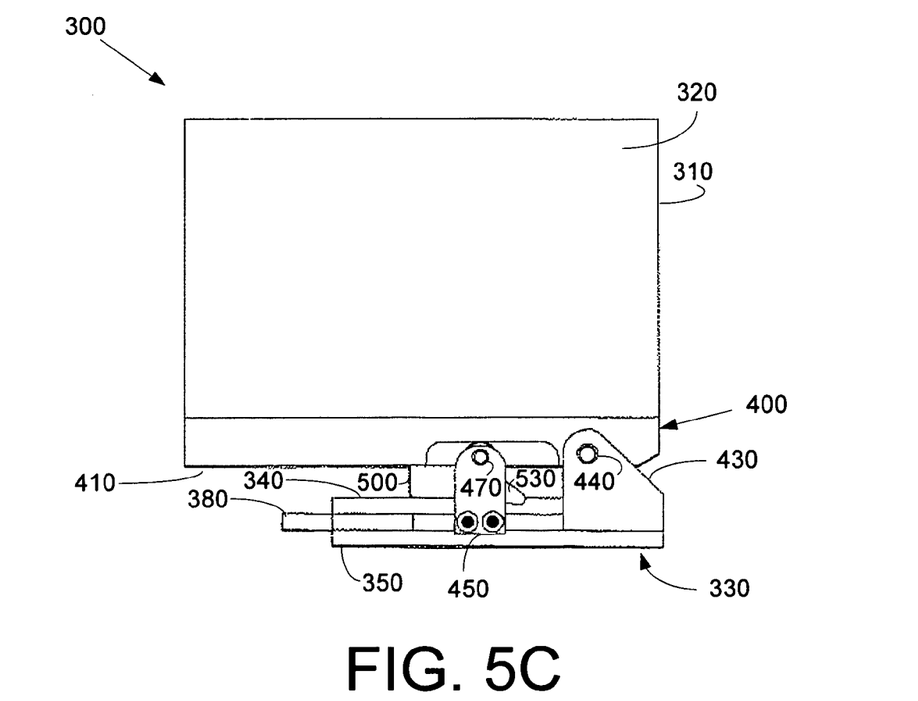
Figure 6C:
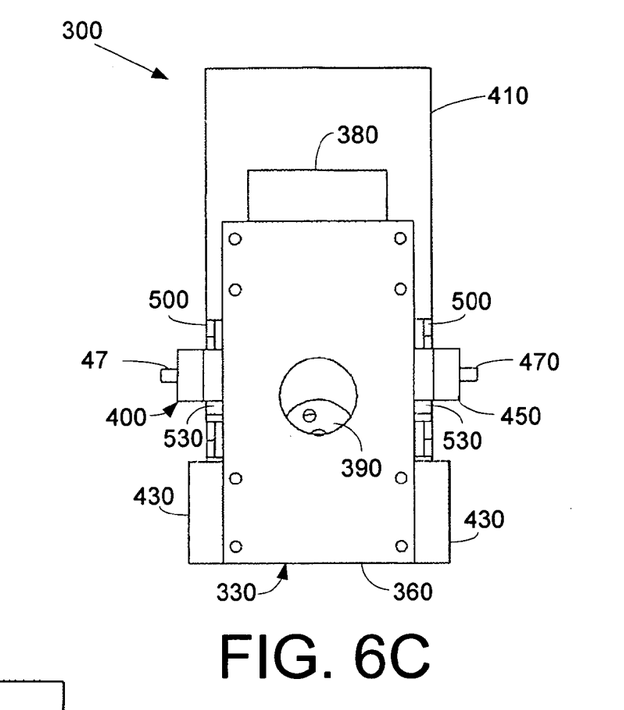

As the plate 380 of the dosing block 330 advances further as shown in FIGS. 5C and 6C, the wheel pins 470 force the cams 530 and the box shoe 410 with the tea box 310 to almost a horizontal position with respect to the dosing bock 330. Likewise, the dosing aperture 390 and the plate 380 of the dosing block 330 move towards the aperture 370 of the bottom block 360.

Figure 5D:
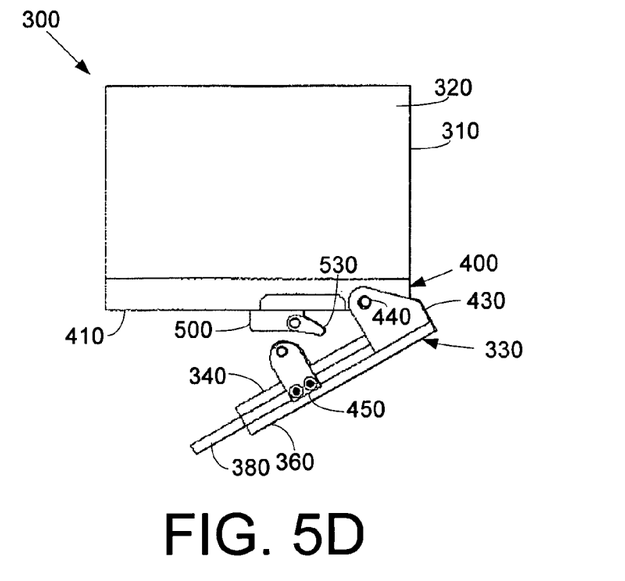
Figure 6D:
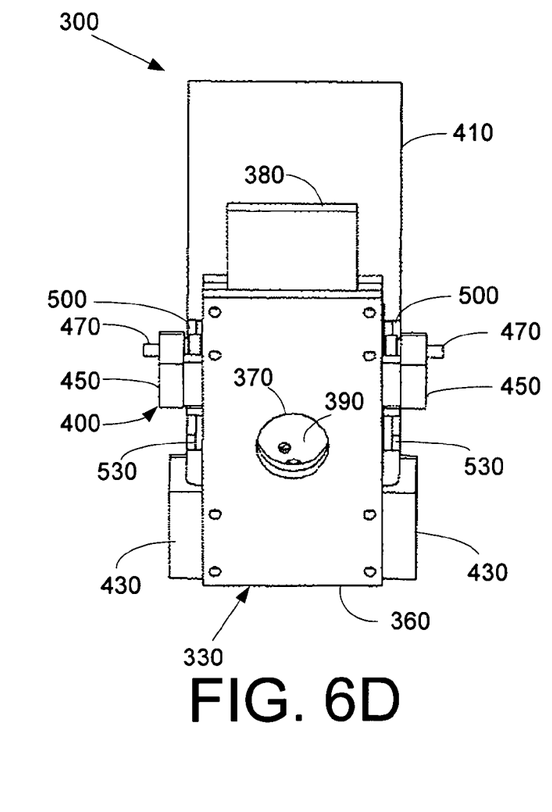

As the plate 380 of the dosing block 330 continues to advance as shown in FIGS. 5D and 6D, the wheel pins 470 ride over the top of the cams 530. The box shoe 410 and the tea box 310 are no longer restrained such that the box shoe 410 pivots upward to its original position. The box shoe 410 may be spring loaded or otherwise biased in the elevated position. This pivoting action also serves to disrupt the tea leaves 320 within the tea box 310. This sudden action ensures a proper flow of tea leaves 320 into the dosing block 330. The dosing aperture 390 of the plate 380 of the dosing block 370 also continues to move towards the aperture 370 of the bottom block 360. Once the plate 380 arrives at its furthest extent, the dosing aperture 390 aligns with the aperture 370 of the bottom block 360 of the dosing block 330 and the measure of tea leaves 320 is dispensed therethrough.

Figure 5E:
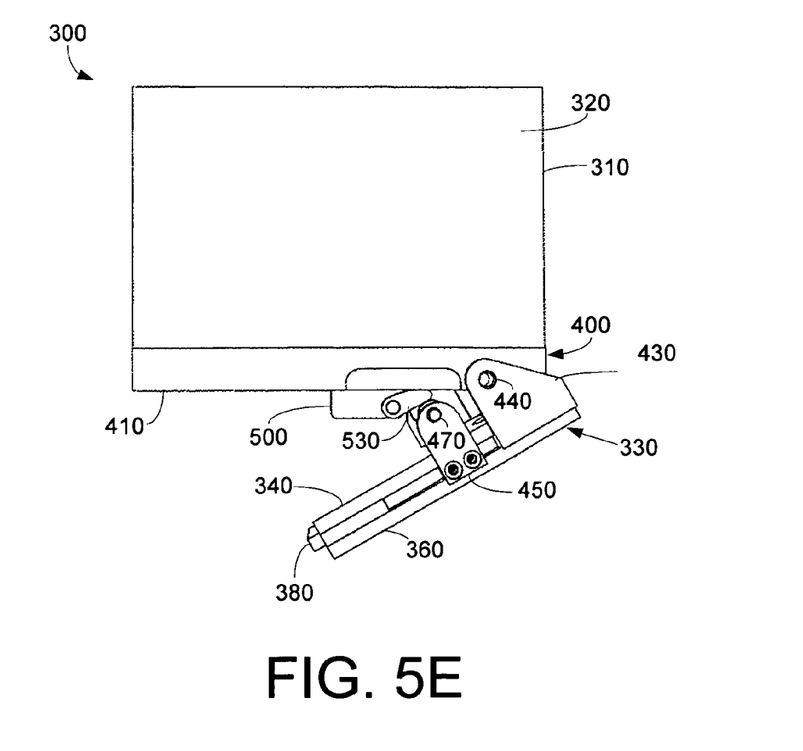
Figure 6E:
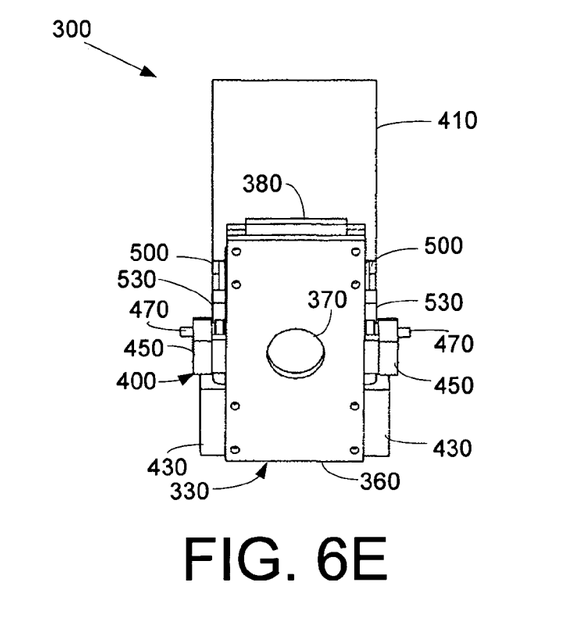

The plate 380 of the dosing block 330 is then maneuvered backwards to its original starting position. In doing so as shown in FIGS. 5E and 6E, the wheel pins 470 of the agitation device 400 ride underneath the cams 530. Once the wheel pins 470 are clear of the cams 530, the cams 530 rotate slightly downward such that the wheel pins 470 can again engage the cams 530 in the next cycle. Although the agitation device 400 has been shown with components positioned on both sides of the dosing block 300, only one set of components may be used.

Operation of the tea dosing system 300 thus provides a precisely measured dose of the tea leaves 320 via the use of the dosing block 330 while also maintaining the tea leaves 320 in a flowable state due to the agitation device 400. The tea dosing system 300 thus provides an accurate does of the tea leaves 320 in each cycle.

Figure 7:
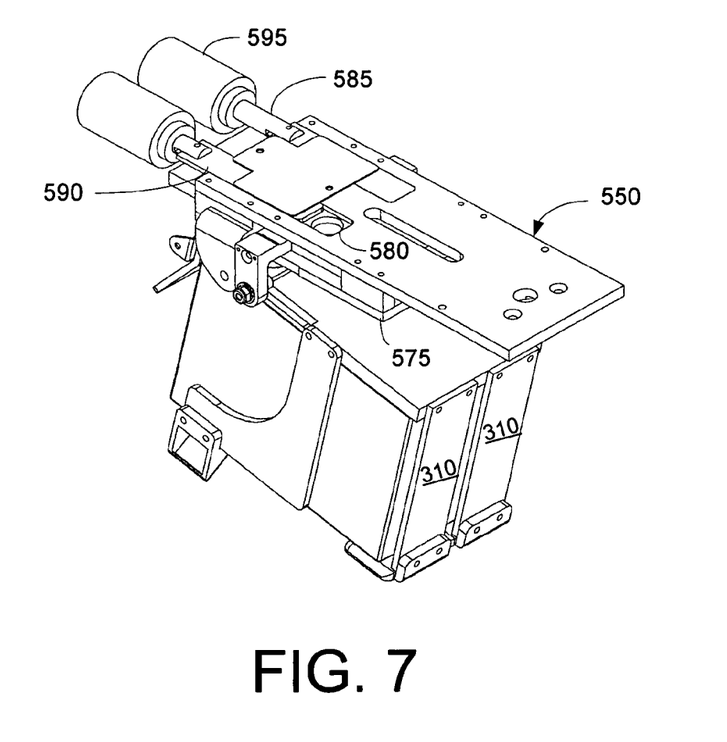
FIG. 7 is a perspective view of an alterative embodiment of a tea dosing system as is described herein.
Figure 8:
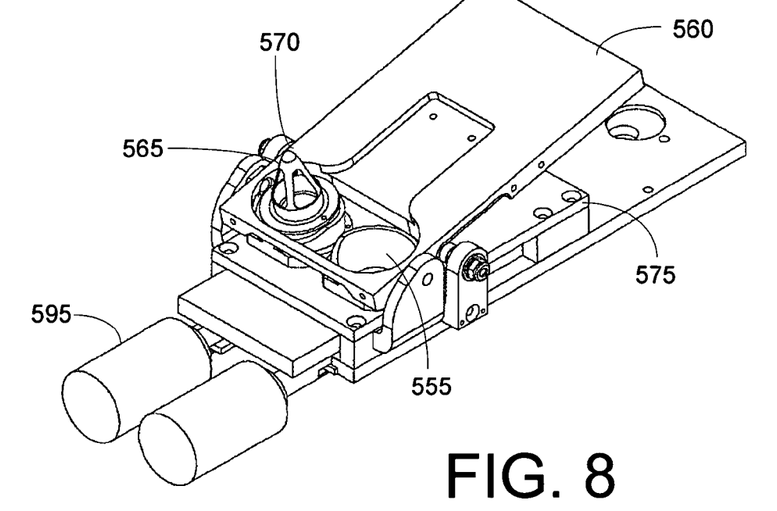
FIG. 8 is a further perspective view of the tea dosing system of FIG. 7.

FIGS. 7 and 8 show an alternative embodiment of a tea dosing system 550. The tea dosing system 550 can accommodate the use of multiple tea boxes 310. In this embodiment, a number of apertures 555 are positioned within a box shoe 560. Each aperture 555 may have a connection system 565 positioned therein. The connection system 565 may have a lance 570 or a similar structure so as to penetrate the tea box 310. Likewise, a dosing block 575 may have multiple apertures 580 therethrough aligned with the connection system 565. Positioned on the dosing block 575 may be a number of sliding knives 585. Each sliding knife 585 may have a plate 590 or other type of enclosure that opens and closes each aperture 580. Each sliding knife 585 may be operated by a solenoid 595 or any other type of device for providing reciprocating motion.

When a particular type of tea leaves 320 is requested, the solenoids 595 open and close the appropriate apertures 580 related to the appropriate tea boxes 310. The tea dosing system 550 then operates in a manner identical to that described above with respect to the tea dosing system 300. Only the tea leaves 320 from the selected tea box 310 or boxes 310 pass through the aperture 580 because of the positioning of the sliding knives 585. Any number of tea boxes 310 may be used herein.

Figure 9:
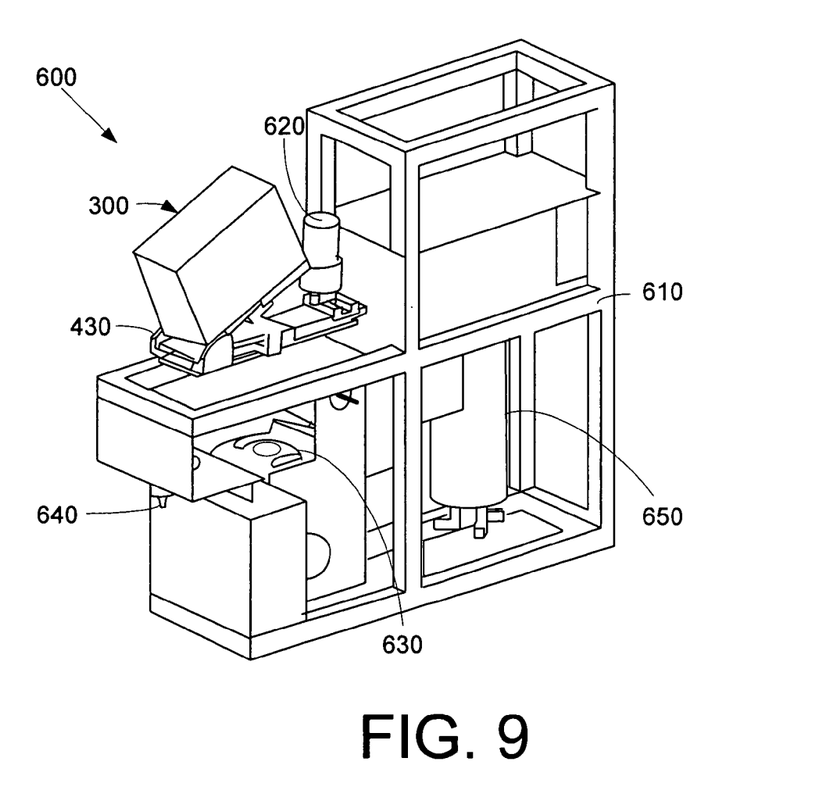
FIG. 9 is a perspective view of a beverage dispenser using the tea dosing system as is described herein
Figure 10:
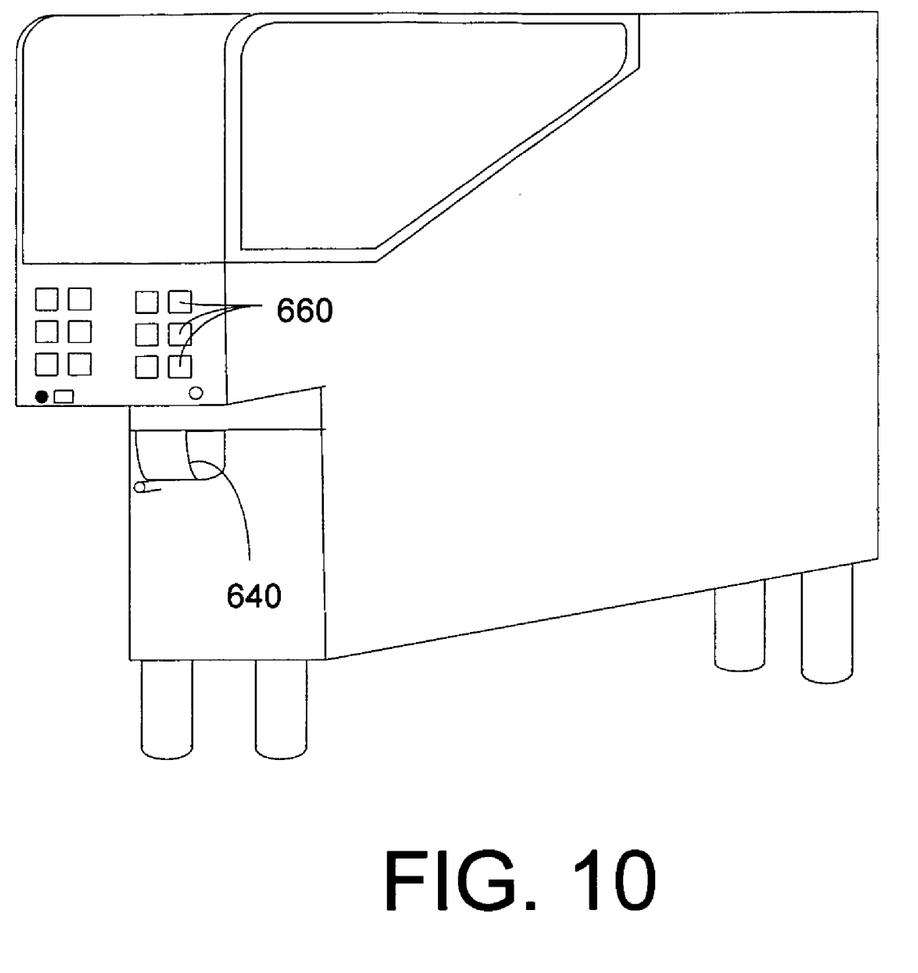
FIG. 10 is a further perspective view of the beverage dispenser of FIG. 9.

FIGS. 9 and 10 show a tea dispenser 600 as is described herein. The tea dispenser 600 may use the tea dosing system 300 as is described above, Specifically, the side bars 430 are attached to a dispenser frame 610 as may be desired. The sliding plate 380 of the dosing block 330 may be operated by the piston 620. As is described above, a piston, a solenoid, or any other type of device providing reciprocating motion may be used herein. The aperture 370 of the bottom block 360 of the dosing block 330 may be in communication with a brewing device 630. The brewing device 630 may be provided by de jong Duke of Sliedrecht, Netherlands. Similar types of devices may be used herein.

The brewing device 630 takes the dose of the tea leaves 320 as provided by the dosing system 300, brews a batch of tea, and then dispenses the tea via a nozzle 640. Multiple batches of tea may be brewed depending upon the desired volume. Hot water for the brewing device may be provided by a boiler 650 or other type of water feeder device. The tea dosing system 300 described herein may be used with any type of brewing system.

The tea dispenser 600 may be automated. As is shown in FIG. 10, the tea dispenser 600 may include any number of selection buttons 660. The selection buttons 660 may indicate the size of the beverage desired (small, medium, and large), whether or not additives such as natural or artificial sweetener, flavoring, nutraceuticals, and the like should be added and how much should be added. An example of similar types of selection devices as may be used herein is shown commonly owned U.S. patent application Ser. No. 11/276,550, filed on Mar. 6, 2006, entitled "Beverage Dispensing System", incorporated herein by reference. Likewise, the various ingredients may be dispensed via a multiflavor nozzle such as that disclosed in commonly owned U.S. patent application Ser. No. 11/276,551, filed Mar. 6, 2006, entitled "Dispensing Nozzle assembly", incorporated herein by reference. The tea itself may be concentrated such that the amount of make up water also may be added to the nozzle 640. A method of brewing concentrated tea is shown in commonly owned U.S. patent Ser. No. 11/530,962, in the name of Kirschner, filed herewith, entitled "Concentrated Fresh Brewed Tea", incorporated herein by reference.

It should be apparent that the foregoing relates only to the preferred embodiments of the present application and that numerous changes and modifications may be made herein by one of ordinary skill in the art without departing from the general spirit and scope of the invention as defined by the following claims and the equivalents thereof.

I claim:

1. A doser for dispensing a predetermined dose of material, comprising:
   an agitation device;
   wherein the material is stored in the agitation device; and
   a dosing block cooperating with the agitation device;
   wherein the dosing block comprises a first plurality of apertures positioned on a first side of the dosing block, a second plurality of apertures positioned on a second side of the dosing block, and a sliding plate positioned between the first side and the second side, the sliding plate comprising a plurality of dosing aperture movable between the first plurality of apertures and the second plurality of apertures; and
   wherein the dosing block comprises a plurality of sliding plates aligned with the second plurality of apertures.

2. The doser of claim 1, wherein the dosing block comprises a plurality of solenoids in communication with the plurality of sliding plates.

3. The doser of claim 1, further comprising a connection system positioned between the agitation device and the doser block.

4. The doser of claim 3, wherein the connection system comprises a lance.

5. The doser of claim 1, wherein the agitation device comprises a material box and wherein the material is positioned within the material box.

6. The doser of claim 1, wherein the agitation device comprises a box shoe for positioning one or more material boxes therein.

7. The doser of claim 6, wherein the agitation device comprises one or more cam blocks attached to the dosing block for movement therewith.

8. The doser of claim 7, wherein the agitation device comprises one or more wheel pins mounted on the one or more cam blocks.

9. The doser of claim 8, wherein the agitation device comprises one or more cams mounted about the box shoe for cooperating with the one or more wheel pins.

* * * * *